(12) United States Patent
Cao et al.

(10) Patent No.: US 10,378,219 B2
(45) Date of Patent: Aug. 13, 2019

(54) ANTI-EXPLOSION TERRACE MATERIAL AND MANUFACTURING METHOD THEREFOR

(71) Applicant: BeiJing Jinwanke decorative Engineering Company Limited, Beijing (CN)

(72) Inventors: Hongsheng Cao, Beijing (CN); Xinmin Wang, Beijing (CN)

(73) Assignee: Beijing Jinwanke decorative Engineering Company Limited, Beijing (CN)

(*) Notice: Subject to any disclaimer, the term of this patent is extended or adjusted under 35 U.S.C. 154(b) by 45 days.

(21) Appl. No.: 15/527,326

(22) PCT Filed: Aug. 10, 2015

(86) PCT No.: PCT/CN2015/086536
§ 371 (c)(1),
(2) Date: May 17, 2017

(87) PCT Pub. No.: WO2016/119434
PCT Pub. Date: Aug. 4, 2016

(65) Prior Publication Data
US 2017/0335574 A1   Nov. 23, 2017

(30) Foreign Application Priority Data
Jan. 26, 2015 (CN) .......................... 2015 1 00407120

(51) Int. Cl.
| E04F 15/12 | (2006.01) |
| C22C 38/04 | (2006.01) |
| E04F 15/00 | (2006.01) |
| C04B 14/04 | (2006.01) |
| C04B 14/34 | (2006.01) |
| C21D 8/00 | (2006.01) |
| C22C 38/02 | (2006.01) |

(52) U.S. Cl.
CPC .............. *E04F 15/12* (2013.01); *C04B 14/04* (2013.01); *C04B 14/34* (2013.01); *C21D 8/005* (2013.01); *C22C 38/02* (2013.01); *C22C 38/04* (2013.01); *E04F 15/00* (2013.01); *E04F 2290/044* (2013.01); *E04F 2290/045* (2013.01)

(58) Field of Classification Search
CPC ..... E04F 15/12; E04F 15/00; E04F 2290/045; E04F 2290/044; C04B 14/04; C04B 14/34; C21D 8/005; C22C 38/02; C22C 38/04
See application file for complete search history.

(56) References Cited

U.S. PATENT DOCUMENTS 5,584,926 A * 12/1996 Borgholm ................ C04B 7/00
106/713
2011/0305592 A1   12/2011 Pelsoeczy et al.

FOREIGN PATENT DOCUMENTS

| CN | 101092849 A | 12/2007 | |
| CN | 102557541 A * | 7/2012 | |
| CN | 103396025 A | 11/2013 | |
| CN | 104072042 A | 10/2014 | |
| CN | 104694814 A | 6/2015 | |
| DE | 2026727 A1 * | 12/1971 | ........... D06N 7/0042 |
| DE | 2166494 A1 | 6/1974 | |
| TW | 436561 B | 5/2001 | |

OTHER PUBLICATIONS

CN 103396025 machine translation (Year: 2013).*
DE 2026727 machine translation (Year: 1971).*
CN 102557541 machine translation (Year: 2012).*
Devi et al. "Properties of concrete manufactured using steel slag." 12th Global Congress on Manufacturing and Management, GCMM 2014, Procedia Engineering 97 (2014) 95-104 (Year: 2014).*

* cited by examiner

*Primary Examiner* — Paul A Wartalowicz
*Assistant Examiner* — Stephani Hill
(74) *Attorney, Agent, or Firm* — Gokalp Bayramoglu

(57) ABSTRACT

An anti-explosion flooring material is disclosed. The material is prepared by foaming modification and rust prevention treatment of an iron alloy material and other auxiliary materials having components in percentage by weight: 85% of iron, 8% of manganese, 6% of silicon, and the remainder carbon. Because a foaming agent and rare earth are added, the static conducting performance of the flooring material is improved.

1 Claim, No Drawings

ANTI-EXPLOSION TERRACE MATERIAL AND MANUFACTURING METHOD THEREFOR

CROSS REFERENCE TO RELATED APPLICATIONS

This application is the national phase of International Application No. PCT/CN2015/086536, filed on Aug. 10, 2015, which is based upon and claims priority to Chinese Patent Application No. 2015100407120, filed on Jan. 26, 2015, the entire contents of which are incorporated herein by reference.

TECHNICAL FIELD

The present invention relates to the field of flooring material, in particular, to an anti-explosion flooring material and the manufacturing method thereof.

BACKGROUND

In industrial buildings like liquefied petroleum gas stations, gas production plants, fireworks and firecracker production plants, alcohol production plants, flour plants that may cause dust explosion, textile plants, etc., due to the special fire-protection and anti-explosion requirements, the demand for the flooring material used in ground construction is very strict. The flooring material must have the non-sparking and anti-explosion features. That is, when the metal or other stiff object hits or rubs the flooring material, the flooring material should not generate any spark or flake, such that fire and explosion accidents can be avoided.

Nowadays, in the market, the flooring material used in anti-explosion field mainly has the following problems: 1, during construction, hazardous substances, formaldehyde, methylbenzene, etc. are released, polluting the environment; 2, most of the materials only have the function of anti-static, while the fire-proof level is low, and cannot meet the demand of anti-explosion in the market; 3, the anti-static and non-spark functions get diminished as the time goes by, and usually the anti-static and non-spark functions no longer exist after 2~3 years, 4, the cost is high.

Three essential conditions must be considered to avoid the occurrence of explosion, i.e., explosion ignition source, oxygen, and inflammable object. As long as one essential condition could be restrained, the occurrence of explosion will be restrained. Currently, all measures are taken towards the equipment such as machines, etc., and staff in the flammable and explosive place to avoid the occurrence of explosion ignition source. However, the floor, as a very important part of the flammable and explosive place should have the anti-explosion function too. The anti-explosion floor avoids the occurrence of explosion by cutting off the explosion ignition source. The main reasons that cause the explosion ignition source are all kinds of frictions, collisions, or sparks generated by static electricity. Thus, the anti-explosion floor should be permanent, stable, and have anti-static and non-spark properties at the same time. Considering the hazards and the secondary burning damages caused by explosion, the floor of building which requires anti-explosion should have the shock-proof function, and the fire-proof level should be A1 level. Thus, the anti-explosion flooring material should have four features: anti-static, non-spark, the fire-proof level of A1, anti-explosion and shock-proof.

The definition of anti-explosion floor: when the construction is going on, the floor of industrial factory building, warehouse is particularly treated or added with certain special material, such that the floor has the functions of anti-static, non-spark, the fire-proof level of A1, anti-explosion and shock-proof, and the floor will not cause flash fire or flash explosion due to static sparks, frictions, and collision sparks.

SUMMARY

The purpose of the present invention is to overcome the defects in the prior art, and to provide an anti-explosion flooring material and a manufacturing method thereof.

The technical solutions used to solve the above technical problem by the present invention are as follows:

The material is prepared from iron alloy. Mass percentages of chemical components of the iron alloy are: iron 85%, manganese 8%, silicon 6%, the rest is carbon.

The anti-explosion flooring material includes the following components: 100 weight parts of iron alloy, 3 weight parts of silicon carbonate, 10 weight parts of rare earth, 5 weight parts of sodium nitrite, 8 weight parts of silica fume, 20 weight parts of cement. The method of the anti-explosion flooring material includes the following steps:

1) Manufacturing of iron alloy particles: iron alloy is smashed to particles of less than −100 mesh. Next, the magnetic separation is conducted using a magnetic separator, so as to remove the impurities. Next, the screening is conducted using a vibrating screen, so as to obtain iron alloy particles of about −100 mesh.

2) Foaming: the iron alloy particles material obtained in step 1) are put into a sintering pot, which is fed into a high-temperature furnace which is heated up to 1500° C. Silicon carbonate and rare earth are added. Calcinating and foaming are conducted for 30 hours. The calcinated and foamed material is cooled down quickly to the room temperature, and is smashed to about 100 mesh by a grinder, such that the material becomes a porous particulate matter.

3) Modification: the particles obtained in step 2) are fed into the calcinator and heated up to 1000'C. After rare earth is added and mixed, the material is cooled down to the room temperature. After the material is smashed by the grinder, particles of −6 mesh~+100 mesh are selected by the vibrating screen. Thereafter, metal aggregates exhibiting non-sparking properties, even in case of impacts and frictions, are obtained.

4) Rust-proof: the particles obtained in step 3) are fed into the calcinator again, which is heated up to 1500° C. During the calcination, inert gas is added for the rust protection. After the calcinating reaction, the material is cooled down to the room temperature. After being smashed by a grinder, particles of −6 mesh~+100 mesh are selected by the vibrating screen. Thereafter, metal aggregates that have the feature of rust-proof are obtained.

5) Metal aggregates obtained in step 4) are added with silica fume, sodium nitrite, and cement, sequentially. The material is mixed well by a mixer. Thereafter, anti-explosion flooring material is obtained.

The product of the present invention has the following features:

1, The slip resistance of the product of the present invention is the same as that of the cement floor. When the floor is constructed together with the cement base material, the floor is integrated with the cement base material as a whole without peeling off. The product of the present invention is clean without causing dusts, crush-resistant, fracture-resistant, tensile-resistant, and has a short construction period. The product of the present invention does not cause any pollution and belongs to the environmental friendly product.

2, The strength of the product of the present invention is 3-5 times as that of terrazzo. The impact-resistance of the product of the present invention is 2-3 times higher than that of terrazzo.

3, The product of the present invention has the features of being highly wear-resistant, impact-resistant, anti-static, weak-acid-resistant, saline-alkaline-resistant, corrosion-proof, etc.

4, The product of the present invention has a long lifetime (20-30 years).

5, The product of the present invention has the anti-freezing and heat-resistant features, with the lower limit of temperature resistance as −80° C., and the upper limit of temperature resistance as +200° C.

BENEFICIAL EFFECTS

The material of the present invention is treated at high-temperatures repeatedly, and is added with different amounts of rare earth to modify the metal aggregate, such that the material has the functions of anti-static, non-spark, the fire-proof level of A1, anti-explosion, impact-resistant, and will not cause flash fire or flash explosion due to static sparks, frictions, and collision sparks. The material of the present invention can be blended with normal cement, and laid on the surface of just built cement, so as to achieve the purpose of anti-explosion. The material of the present invention further improves the abrasion-resistance of the surface of cement significantly, and meanwhile the abilities of crush-resistant, fracture-resistant, tensile-resistant, and impact-resistant are enhanced. Moreover, the construction and maintenance are convenient. The durability of engineering use is good. The dust is avoided. The indoor environment of the industrial building is improved significantly. The market demand is met.

DETAILED DESCRIPTION

Regarding the function requirement of flooring, the present invention can use a manufacturing process with different ratios, so as to prepare floor material with low-cost and high-performance.

Hereinafter, the principle and features of the present invention are described with reference to the following embodiments. Examples set here are only used to interpret the present invention, and are not used to limit the scope of the present invention.

Embodiment 1: Manufacturing of the Material of the Present Invention

1) Manufacturing of iron alloy particles: iron alloy is smashed to particles of less than −100 mesh. The mass percentages of chemical components of the iron alloy are: iron 85%, manganese 8%, silicon 6%, the rest is carbon. Next, the magnetic separation is conducted using a magnetic separator, so as to remove the impurities. Next, the screening is conducted using a vibrating screen, so as to obtain iron alloy particles of about −100 mesh.

2) Foaming: the iron alloy particles material obtained in step 1) are put into a sintering pot, which is fed into a high-temperature furnace which is heated up to 1500° C. Silicon carbonate and rare earth are added. Calcinating and foaming are conducted for 30 hours. The calcinated and foamed material is cooled down quickly to the room temperature, and is smashed to about 100 mesh by a grinder, such that the material becomes porous particulate matter.

3) Modification: the particles obtained in step 2) are fed into the calcinator and heated up to 1000° C. After rare earth is added and mixed, the material is cooled down to the room temperature. After the material is smashed by the grinder, particles of −6 mesh~+100 mesh are selected by the vibrating screen. Thereafter, metal aggregates exhibiting non-sparking properties, even in case of impacts and frictions, are obtained.

4) Rust-proof: the particles obtained in step 3) are fed into the calcinator again, which is heated up to 1500° C. During the calcination, inert gas is added for the rust protection. After the calcinating reaction, the material is cooled down to the room temperature. After being smashed by a grinder, particles of −6 mesh~+100 mesh are selected by the vibrating screen. Thereafter, metal aggregates that have the feature of rust-proof are obtained.

5) Metal aggregates obtained in step 4) are added with silica fume, sodium nitrite, and cement, sequentially. The material is mixed well by a mixer. Thereafter, anti-explosion flooring material is obtained.

Application Embodiment 1

At the beginning of 2010, Flight Test and Research Institute of China laid the anti-explosion flooring material of Embodiment 1 of the present invention in an aircraft repair shed. The construction area is 3000 square meters. The floor has been used up to now without any occurrence of spark accidents, proving that the material of the present invention completely meets the anti-explosion demands of floor by special industries in practice. All kinds of performance parameters and characters of the material are shown in detail in Table 1.

TABLE 1 the properties and characters of the material of the present invention

| properties | material anti-explosion flooring material of the present invention |
| --- | --- |
| strength | 116.2 |
| rigidity of aggregates (Moh's hardness) | 8 |
| abrasion-resistance the gear method\the steel ball method (GB/T12988) | 0.012 g/cm$^2$ |
| anti-static | surface resistance is $10^5$-$10^6$ Ω |
| non-spark property | the function of non-spark for the lifetime |
| rust-proof property | immersed in 5% NaCL solution for 5 years and 8 months, no rust spot, no expansion or cracks due to the moisture |
| oil-resistance | immersed in the oil for three years, the strength does not decrease; oil penetrating <0.3 mm (with anti-penetrability) |
| level suitable for air cleanliness | 10000 |
| thickness | 4-5 mm |
| environmental protection property | during the construction, no hazardous gas released, no pollution generated |
| construction period | the construction period is short (after the initial solidification of under-layer cement, the construction can begin, |

TABLE 1-continued the properties and characters of the material of the present invention

| properties | material anti-explosion flooring material of the present invention |
|---|---|
| construction characters | the material of the present invention and the cement can be solidified simultaneously) dry-condition construction, no dust, low noise |

The contents described above are only preferred embodiments of the present invention. However, the protection scope of the present invention is not limited to this. Within the technical scope disclosed by the present invention, modifications or alternations that can be easily conceived by a person of ordinary skill in the art should all fall in the protection scope of the present invention.

What is claimed is:

1. A method for manufacturing an anti-explosion material for flooring, comprising:
1) manufacturing iron alloy particles, wherein the step of manufacturing iron alloy particles comprises: smashing an iron alloy to particles of less than 100 mesh; next, conducting a magnetic separation on the particles of less than 100 mesh using a magnetic separator to remove impurities to obtain pure particles; next, screening the pure particles using a vibrating screen to obtain the iron alloy particles of less than 100 mesh;
2) foaming, wherein the step of foaming comprises: putting the iron alloy particles obtained in the step 1) into a sintering pot, feeding the sintering pot into a high-temperature furnace and heating the high-temperature furnace to a temperature of up to 1500° C.; adding silicon carbonate and rare earth to the iron alloy particles to obtain a first mixture; calcinating and foaming the first mixture for 30 hours to obtain a calcinated and foamed material; cooling down the calcinated and foamed material to room temperature; smashing the calcinated and foamed material to about 100 mesh by a grinder to obtain a porous particulate matter;
3) modifying, wherein the step of modifying comprises: feeding the porous particulate matter obtained in the step 2) into a calcinator and heating the calcinator to a temperature of up to 1000° C.; adding and mixing rare earth with the porous particulate matter to obtain a second mixture, cooling down the second mixture to room temperature; after smashing the second mixture by the grinder, selecting particles of 6 mesh-100 mesh by the vibrating screen to obtaining first metal aggregates exhibiting non-sparking properties;
4) rust-proofing, wherein the step of rust-proofing comprises: feeding the first metal aggregates obtained in the step 3) into the calcinator again, and heating the calcinator to a temperature of up to 1500° C. to perform a calcinating to obtain first calcinated metal aggregates; when performing the calcinating, adding an inert gas for a rust protection; after the calcinating, cooling down the first calcinated metal aggregates to room temperature; smashing the first calcinated metal aggregates by the grinder; selecting particles of 6 mesh-100 by the vibrating screen to obtain second metal aggregates having a feature of rust-proof; and
5) adding silica fume, sodium nitrite, and cement, sequentially into the second metal aggregates obtained in the step 4) to obtain a third mixture; uniformly mixing the third mixture by a mixer to obtain the anti-explosion material for flooring;

wherein the anti-explosion material comprises iron alloy, silicon carbonate, rare earth, sodium nitrite, silica fume, and cement, and a weight ratio of the iron alloy, the silicon carbonate, the rare earth, the sodium nitrite, the silica fume, and the cement is 100:3:10:5:8:20.

* * * * *